United States Patent
Lin et al.

(10) Patent No.: US 10,021,364 B2
(45) Date of Patent: Jul. 10, 2018

(54) METHOD OF BUILDING STEREOSCOPIC MODEL WITH KALMAN FILTERING

(71) Applicant: CHUNG YUAN CHRISTIAN UNIVERSITY, Taoyuan (TW)

(72) Inventors: Po-Ting Lin, Taoyuan (TW); Shu-Ping Lin, Taoyuan (TW); Wei-Hao Lu, Taoyuan (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 0 days.

(21) Appl. No.: 15/371,361

(22) Filed: Dec. 7, 2016

(65) Prior Publication Data

US 2017/0188003 A1 Jun. 29, 2017

(30) Foreign Application Priority Data

Dec. 28, 2015 (TW) .............................. 104144117 A

(51) Int. Cl.
*H04N 13/00* (2018.01)
*H04N 13/02* (2006.01)
*G06T 7/73* (2017.01)

(52) U.S. Cl.
CPC ............ *H04N 13/0018* (2013.01); *G06T 7/73* (2017.01); *H04N 13/0275* (2013.01); *G06T 2207/10012* (2013.01); *G06T 2207/10021* (2013.01)

(58) Field of Classification Search
CPC ............ H04N 13/0018; H04N 13/0275; G06T 2207/10012; G06T 7/73; G06T 2207/10021
See application file for complete search history.

(56) References Cited

PUBLICATIONS

Wei, Lijun, et al. "Intelligent vehicle localization in urban environments using ekf-based visual odometry and gps fusion." IFAC Proceedings vols. 44.1 (2011): 13776-13781.*
Falkenhagen, Lutz, and M. Strintzis. "3D object-based depth estimation from stereoscopic image sequences." Proc. Internat. Workshop on Stereoscopic and 3D Imaging. vol. 95. 1995.*

* cited by examiner

*Primary Examiner* — Bhavesh Mehta
*Assistant Examiner* — Menatoallah Youssef
(74) *Attorney, Agent, or Firm* — Tim Tingkang Xia, Esq.; Locke Lord LLP

(57) ABSTRACT

A method of building a stereoscopic model with Kalman filtering (KF) is provided. The method entails capturing images of the environment with a sensing device to build the stereoscopic model and then correcting a static object and a dynamic object in the environmental images with Kalman filtering to enhance the accuracy of the stereoscopic model. The prior art is a great reduction of accuracy in simultaneous localization and mapping (SLAM) in the event of increased system variation, increased complexity, or increased involved field. The method overcomes a drawback of the prior art.

4 Claims, 3 Drawing Sheets

US 10,021,364 B2

METHOD OF BUILDING STEREOSCOPIC MODEL WITH KALMAN FILTERING

CROSS REFERENCE

This non-provisional application claims priority from Taiwan Patent Application No. 104144117 filed on Dec. 28, 2015, the content thereof is incorporated by reference herein.

BACKGROUND OF THE INVENTION

Field of the Invention

The present invention relates to methods of building stereoscopic models and, more particularly, to a method of building a stereoscopic model with Kalman filtering that corrects errors and enhances accuracy.

Description of the Prior Art

Human beings, objects, and spaces are visualized mainly by 2D pictures displayed on a conventional network or application. Surfers watch a human being, an object, and a space from different angles or in different directions by browsing multiple 2D pictures taken of the human being, the object, and the space from different angles. The prior art has drawbacks as follows: a lack of stereoscopicity and directivity; the surfers have to browse, one by one, multiple 2D pictures taken from different angles; the 2D pictures do not enable the surfers to intuitively choose to browse the images of the human being, the object, and the space from a specific angle; and, when browsing a 2D picture, the surfers have to imagine or judge the angle from which the 2D picture was taken of the human being, the object, or the space. For example, a physician providing a long-distance medical service to a patient can watch the patient's face by long distance photography, only if the physician and the patient are online simultaneously; however, the physician is unable to manipulate and choose whatever angles of view but has to instruct the patient to rotate his or her head. Alternatively, if the physician and the patient are not online simultaneously, the patient may take pictures of himself or herself and then send the pictures to the system end for the physician to browse; however, the physician can only browse the pictures one by one rather than watch the patient's on the spot and with stereoscopicity.

To achieve stereoscopicity, the prior art discloses building a 3D model of a human being or an object with stereoscopic imaging techniques, such as feature-point based recognition and trigonometry. However, 3D stereoscopic space stereoscopic imaging requires special instruments, entails building a model of a "specific subject", incurs high costs, takes much time, and is predisposed to distortion. Conventional panoramas, Google Street View, and Photo Tourism allow users to access a view from a fixed reference point rather than provide an omnidirectional view of a specific subject.

Panoramas, which are created by joining multiple pictures, are good at processing simple spatial relationships but poor in visualizing a single object. Google Street View requires special equipment for capturing images and spatial information to construct a spatial correlation between images. Photo Tourism (Photo synth) creates an image space by a 3D stereoscopic model building process and searches for pictures according to relative positions of feature points.

Taiwan patent 1476729, entitled "Method and system for integrating 2D picture and 3D model, and computer program product of the same", discloses: a corresponding relationship between a 3D stereoscopic model and a 2D picture is constructed; the system provides an operating interface; functions provided by the operating interface comprise specifying a feature point on the 2D picture and configuring a confirmation point on the 3D stereoscopic model, wherein the confirmation point corresponds to the feature point; a display space vector of the 2D picture is determined according to a viewing angle space vector of the 3D stereoscopic model; and a 2D picture corresponding to a display space vector is selected and displayed as soon as the operating interface displays the 3D stereoscopic model according to a specific viewing angle space vector. However, Taiwan patent 1476729 has a drawback, that is, during a process of building a 3D stereoscopic model, increased system variation, increased complexity, or increased coverage, for example, in the situation where objects are moving, tends to cause system misreading and accuracy deterioration, thereby leading to the distortion of the 3D stereoscopic model thus built.

SUMMARY OF THE INVENTION

The present invention provides a method of building a stereoscopic model with Kalman filtering to process state-related factors, such as fields, variations, and functions, and provide a physical model and a recursive relation between different states, so as to correct errors arising from increased system variation, increased complexity, or increased involved field.

In order to achieve the above and other objectives, the present invention provides a method of building a stereoscopic model with Kalman filtering. The method comprises the steps of: providing a body, a processing device, and a computing device, with the body having a sensing device, the processing device having a storing unit and being in signal communication with the sensing device and the computing device, respectively; capturing an image from a space with the sensing device; classifying the image into a static image and a dynamic image with the processing device, with the static image carrying a first time static image information, a second time static image information, and a third time static image information, with the dynamic image carrying a first time dynamic image information, a second time dynamic image information, and a third time dynamic image information; calculating a static object spatial position and a corrected static object spatial position of the static image by the computing device with Kalman filtering according to the first time static image information, the second time static image information, and the third time static image information; storing data indicative of the static object spatial position and data indicative of the corrected static object spatial position in a first database by the storing unit; building a first stereoscopic model by the processing device according to the first database; calculating a dynamic object spatial position and a corrected dynamic object spatial position of the dynamic image by the computing device with Kalman filtering according to the first time dynamic image information, the second time dynamic image information, and the third time dynamic image information; storing data indicative of the dynamic object spatial position and data indicative of the corrected dynamic object spatial position in a second database by the storing unit; and building a second stereoscopic model by the processing device according to the second database.

In a preferred embodiment of the present invention, the method further comprises the steps of: determining whether to update the first stereoscopic model and the second stereoscopic model; capturing an image from the space with the sensing device upon an affirmative determination; and ending a process flow of the method upon a negative determination.

In a preferred embodiment of the present invention, the method further comprises the step of using extended Kalman filtering (EKF) to enhance precision of the first stereoscopic model.

In a preferred embodiment of the present invention, the method further comprises the step of using extended Kalman filtering to enhance precision of the second stereoscopic model.

DETAILED DESCRIPTION OF THE EMBODIMENTS

Features and functions of the technical means and structures applied to the present invention to achieve the aforesaid objectives and effects are depicted by drawings, illustrated with preferred embodiments, and described below so as to be fully comprehensible but not restrictive of the present invention.

Figure 1:
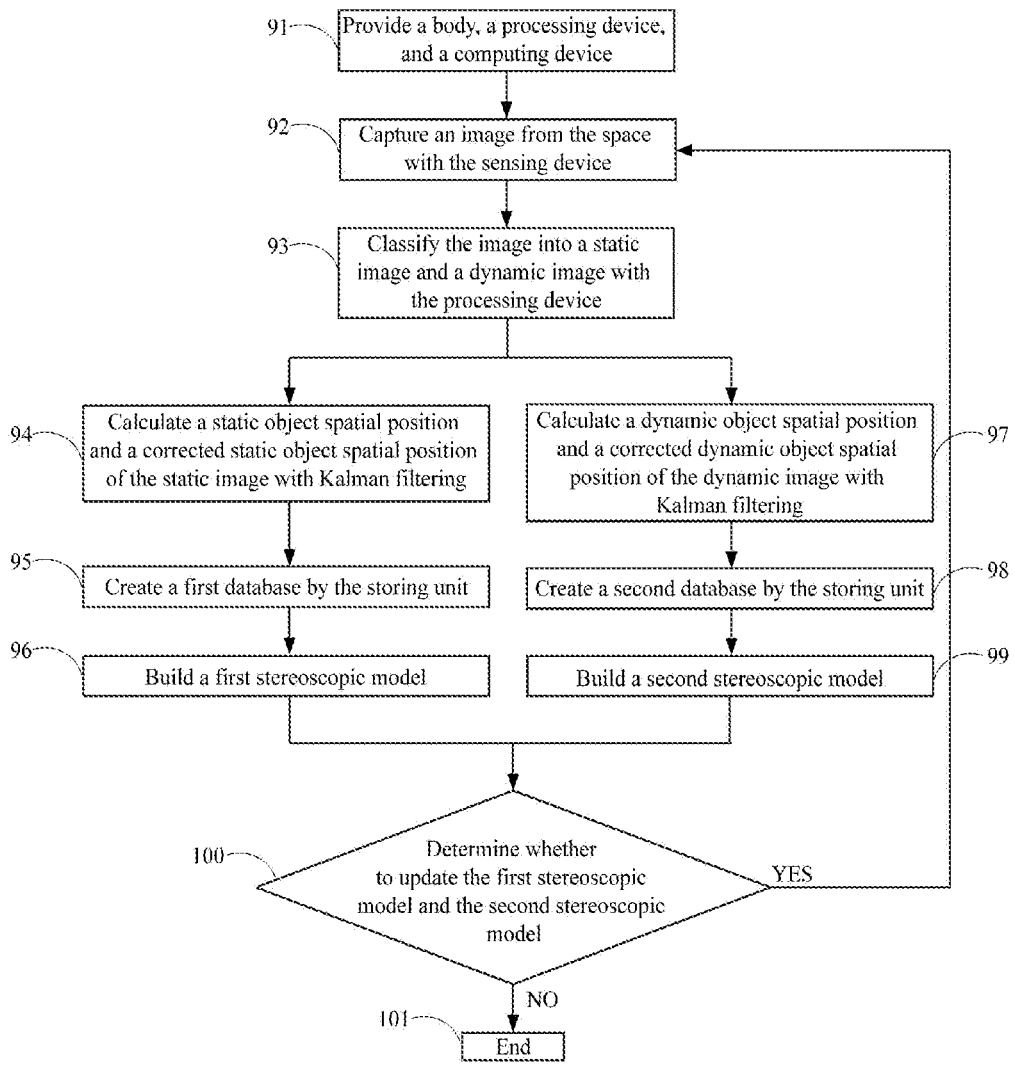
FIG. 1 is a flowchart of a method of building a stereoscopic model with Kalman filtering according to a preferred embodiment of the present invention.
Figure 2:
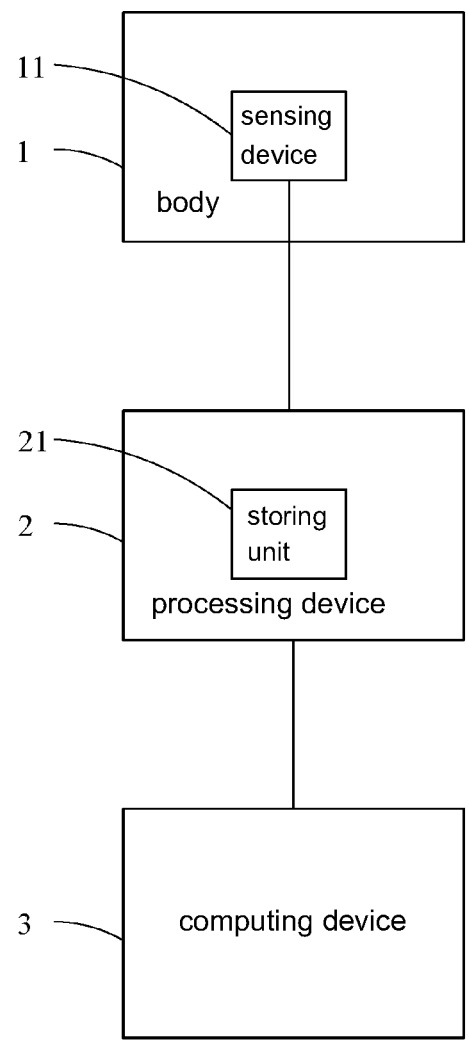
FIG. 2 is a schematic view of the framework of a system for use with the method of building a stereoscopic model with Kalman filtering.
Figure 3:
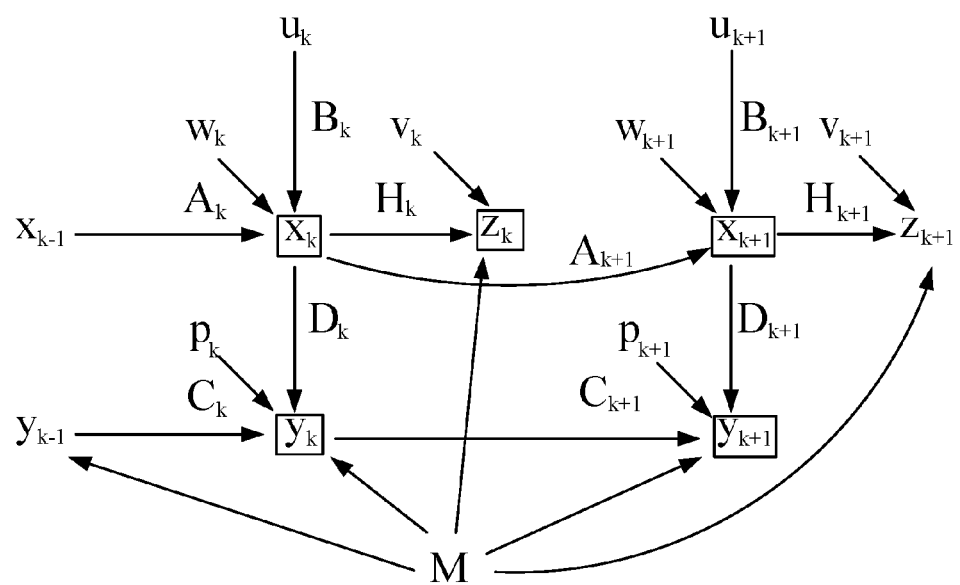
FIG. 3 is a schematic view of a stereoscopic model built with Kalman filtering by the method according to a preferred embodiment of the present invention.

Referring to FIG. 1, FIG. 2 and FIG. 3, there are shown a flowchart, a schematic view of the framework of a system, and a schematic view of a stereoscopic model of a method of building a stereoscopic model with Kalman filtering according to a preferred embodiment of the present invention. The method of building a stereoscopic model with Kalman filtering comprises the steps described below.

Step 91: provide a body 1, a processing device 2, and a computing device 3. The body 1 is capable of moving and comprises a sensing device 11. The sensing device 11 captures an image information pertaining to a space. Both the processing device 2 and the computing device 3 process the image information captured by the sensing device 11. The processing device 2 has a storing unit 21. The processing device 2 is in signal communication with the sensing device 11 and the computing device 3, respectively.

Step 92: capture an image from the space with the sensing device 11 (not shown). The sensing device 11 captures an image information pertaining to the space regardless of whether the body 1 is standing still or moving. At the $(k-1)^{th}$ point in time, the body 1 is located at $X_{k-1}$, and the sensing device 11 captures image $Z_{k-1}$. At the next point in time, i.e., the $k^{th}$ point in time, the body 1 is located at $X_k$. Hence, the relation between $X_{k-1}$ and $X_k$ is expressed by equation (1) below.

$$x_k = A_k x_{k-1} + B_k u_k + w_k \quad (1)$$

where $X_k$ and $x_{k-1}$ denote position variations, $A_k$ and $B_k$ denote a transition matrix of a system prediction state and a transition matrix of a control vector, respectively, $u_k$ denotes a control vector, and $w_k$ denotes an error correction.

Step 93: classify the image into a static image (not shown) and a dynamic image (not shown) with the processing device. Since every image captured of the space is attributed to a static object and a moving dynamic object, after receiving the image captured with the sensing device 11, the processing device 2 classifies the image into the static image and the dynamic image by recognition software. The static image carries a first time static image information, a second time static image information, and a third time static image information which are indicative of the static images captured with the sensing device 11 at the $(k-1)^{th}$, $k^{th}$, and $(k+1)^{th}$ points in time, respectively. Similarly, the dynamic image carries a first time dynamic image information, a second time dynamic image information, and a third time dynamic image information which are indicative of the dynamic images captured with the sensing device 11 at the $(k-1)^{th}$, $k^{th}$, and $(k+1)^{th}$ points in time, respectively.

Step 94: calculate a static object spatial position and a corrected static object spatial position of the static image with Kalman filtering. The computing device calculates a static object spatial position and a corrected static object spatial position (for correcting errors) of the static image with Kalman filtering (KF) according to the first time (k−1) static image information, the second time (k) static image information, and the third time (k+1) static image information. Take the $k^{th}$ point in time as an example, a static object spatial position of the static image is expressed by equation (2) below.

$$z_k = H_k x_k + v_k \quad (2)$$

where $z_k$ expresses the static object spatial position, $H_k$ expresses a transition matrix of an image information, and $v_k$ expresses the corrected static object spatial position.

Step 95: create a first database by the storing unit. The storing unit stores data indicative of the static object spatial position and data indicative of the corrected static object spatial position in a first database.

Step 96: build a first stereoscopic model. The processing device builds a first stereoscopic model according to the first database.

Step 97: calculate a dynamic object spatial position and a corrected dynamic object spatial position of the dynamic image with Kalman filtering. The dynamic object in the space and the body 1 move simultaneously. To gather accurate information about the relative positions of the dynamic object and the body 1, the computing device calculates a dynamic object spatial position and a corrected dynamic object spatial position (for correcting errors) of the dynamic image with Kalman filtering and according to the first time (k−1) dynamic image information, the second time (k) dynamic image information, and the third time (k+1) dynamic image information. Take the $k^{th}$ point in time as an example, the relation of a dynamic object spatial position of the dynamic image is expressed by equation (3) below.

$$y_k C_k y_{k-1} + D_k x_k + p_k \quad (3)$$

where $y_k$ and $y_{k-1}$ denote position variations of dynamic object, $C_k$ and $D_k$ denote a transition matrix of state variations and a transition matrix of state vectors, respectively, and $P_k$ denotes an error correction.

Step 98: create a second database by the storing unit. The storing unit stores data indicative of the dynamic object spatial position and data indicative of the corrected dynamic object spatial position in a second database.

Step 99: build a second stereoscopic model. The processing device builds a second stereoscopic model according to the second database.

In an embodiment of the present invention, the method further comprises the step of using extended Kalman filtering (EKF) to enhance precision of the first stereoscopic model.

In an embodiment of the present invention, the method further comprises the step of using extended Kalman filtering to enhance precision of the second stereoscopic model.

In an embodiment of the present invention, after step 96 and step 99, the method further comprises step 100 of determining whether to update the first stereoscopic model and the second stereoscopic model. The processing device determines whether to keep updating the first stereoscopic model and the second stereoscopic model. Upon an affirmative determination, the process flow of the method goes back to step 92. Upon a negative determination, the process flow of the method goes to step 101, thereby ending the process flow of the method.

With reference to the above description of the method, calculations performed with Kalman filtering and the built stereoscopic model of the present invention are described below.

The relation of the positions of the body 1 at two adjacent points in time, respectively, is expressed by equation (1). Take the $(k-1)^{th}$ point in time and the $(k)^{th}$ point in time as an example, equation (1) is changed to produce equation (4) as follows:

$$\widehat{x}_{k|k-1} = A_k \widehat{x}_{k-1|k-1} + B_k u_k \qquad (4)$$

wherein $\widehat{x}_{k|k-1}$ and $\widehat{x}_{k-1|k-1}$ express the estimated vectors of the body at different points in time, respectively.

Hence, the first Kalman gain of the body 1 in motion is inferred according to the covariance of the estimated vectors, as shown in equation (5) below.

$$K_k^1 = X_{k|k-1} H_k^T S_k^{-1} \qquad (5)$$

where expresses the first Kalman gain, $X_{k|k-1}$ expresses the covariance of the estimated vectors of the body, $H_k$ denotes a transition matrix of state vectors, wherein the superscript T denotes the transpose operator, $S_k$ denotes the covariance of measurement errors, and the subscript −1 denotes the inverse matrix operator.

The first Kalman gain thus calculated is substituted into equation (2) to estimate the position of the static object with extended Kalman filtering and determine the static object spatial position and corrected static object spatial position.

Likewise, the relation of the positions of the dynamic object at two adjacent points in time, respectively, is expressed by equation (3). Take the $(k-1)^{th}$ point in time and the $(k)^{th}$ point in time as an example, equation (3) is changed to produce equation (6) as follows:

$$\widehat{y}_{k|k-1} = C_k \widehat{y}_{k-1|k-1} + D_k \widehat{x}_{k|k-1} \qquad (6)$$

where $\widehat{y}_{k|k-1}$ and $\widehat{y}_{k-1|k-1}$ express the estimated vectors of the dynamic object at different points in time, respectively.

Hence, the second Kalman gain of the dynamic object is inferred according to the covariance of the estimated vectors of the dynamic object and the corrections to environmental errors, with reference to the estimated vectors of the body, as shown in equation (7) below.

$$K_k^2 = X_{k|k-1} D_k^T Y_{k|k-1}^{-1}; \qquad (7)$$

where $K_k^2$ expresses the second Kalman gain, $D_k$ expresses a transition matrix of state vectors, and $Y_{k|k-1}$ expresses the covariance of the estimated vectors of the dynamic object.

Hence, it is feasible to estimate the positions of the dynamic object and determine the dynamic object spatial position and corrected dynamic object spatial position.

It is also feasible to build a universal positioning model. The relation between the first Kalman gain, the second Kalman gain, the estimated vectors $\widehat{x}_{k-1|k-1}$ of the body, and the measurement corrections is expressed by equation (8) below.

$$\widehat{x}_{k|k} = \widehat{x}_{k|k-1} + K_k^1 \widehat{a}_k + K_k^2 (y_k - \widehat{y}_{k|k-1}) \qquad (8)$$

where $\widehat{a}_k$ expresses a space measurement correction, and $(y_k - \widehat{y}_{k|k-1})$ expresses a dynamic object measurement correction.

The position variation of the dynamic object at the preceding point in time is inferred by equations (7), (8). Considering the covariance of the dynamic object measurement correction and the estimated vectors of the dynamic object, it is feasible to infer the third Kalman gain of the dynamic object at the preceding point in time, as shown in equation (9) below.

$$K_{k-1}^3 = Y_{k-1|k-2} C_k^T M_k^{-1}, \qquad (9)$$

where expresses the third Kalman gain, $C_k$ expresses a transition matrix of the state vectors, and $M_k$ expresses the covariance of measurement errors.

Given the aforesaid computation, the first Kalman gain, second Kalman gain, and third Kalman gain are calculated and used to efficiently correct errors and enhance the accuracy in building a stereoscopic model.

In conclusion, the present invention provides a method of building a stereoscopic model with Kalman filtering to not only overcome a drawback of the prior art, that is, the conventional process of building a stereoscopic model is predisposed to system misreading and accuracy deterioration in the event of increased system variation, increased complexity, or increased involved field, but also efficiently correct errors and enhance the accuracy of the stereoscopic model thus built.

The above detailed description sufficiently shows that the present invention has non-obviousness and novelty and thus meets patentability requirements. However, the aforesaid preferred embodiments are illustrative of the present invention only, but should not be interpreted as restrictive of the scope of the present invention. Hence, all equivalent changes and modifications made to the aforesaid embodiments should fall within the scope of the claims of the present invention.

What is claimed is:
1. A method of building a stereoscopic model with Kalman filtering (KF), the method comprising the steps of:
  (a) providing a body, a processing device, and a computing device, with the body having a sensing device, the processing device having a storing unit and being in signal communication with the sensing device and the computing device, respectively;
  (b) capturing an image from a space with the sensing device;
  (c) classifying the image into a static image and a dynamic image with the processing device, with the static image carrying a first time static image information, a second time static image information, and a third time static image information, with the dynamic image carrying a first time dynamic image information, a second time dynamic image information, and a third time dynamic image information;

(d) calculating a static object spatial position and a corrected static object spatial position of the static image by the computing device with Kalman filtering according to the first time static image information, the second time static image information, and the third time static image information;

(e) storing data indicative of the static object spatial position and data indicative of the corrected static object spatial position in a first database by the storing unit;

(f) building a first stereoscopic model by the processing device according to the first database;

(g) calculating a dynamic object spatial position and a corrected dynamic object spatial position of the dynamic image by the computing device with Kalman filtering according to the first time dynamic image information, the second time dynamic image information, and the third time dynamic image information;

(h) storing data indicative of the dynamic object spatial position and data indicative of the corrected dynamic object spatial position in a second database by the storing unit; and (i) building a second stereoscopic model by the processing device according to the second database.

2. The method of claim 1, further comprising the steps of:

(j) determining whether to update the first stereoscopic model and the second stereoscopic model;

(k) going back to step (b) upon an affirmative determination; and (l) ending a process flow of the method upon a negative determination.

3. The method of claim 1, further comprising the step of using extended Kalman filtering (EKF) to enhance precision of the first stereoscopic model.

4. The method of claim 1, further comprising the step of using extended Kalman filtering to enhance precision of the second stereoscopic model.

\* \* \* \* \*